3,193,584
HYDROGENATION OF HYDROXY AROMATICS AND ALKOXY AROMATICS WITH RUTHENIUM CATALYST

Paul N. Rylander, Newark, and John Francis Kreidl, Summit, N.J., assignors to Engelhard Industries, Inc., Newark, N.J., a corporation of Delaware
No Drawing. Filed Apr. 14, 1961, Ser. No. 102,941
6 Claims. (Cl. 260—611)

This invention relates to a hydrogenation process and more especially to a process for the catalytic hydrogenation of hydroxy-substituted aromatic hydrocarbons and alkoxy-substituted aromatic hydrocarbons with ruthenium catalyst, characterized by a considerably increased reaction rate.

Hydrogenation of alkoxybenzenes using Pt and Rh catalysts is known. Use of Pt catalyst is disadvantageous because extensive hydrogenolysis accompanies the reaction. Rh is a more effective catalyst than Pt but is not entirely satisfactory because sensitive to sulfur poisoning. The advantages in using Ru as catalyst are that no detectable hydrogenolysis occurs, and Ru is not nearly as sensitive to sulfur poisoning as Rh. However, with rare exceptions, Ru cannot be used as the hydrogenation catalyst at low temperatures and pressures except in aqueous solutions, so that any process which will augment the use of a Ru catalyst in an aqueous solvent or diluent will be extremely useful.

It has been shown heretofore that when Raney nickel is used as catalyst in the hydrogenation of alkyl phenols, an aqueous base hinders the hydrogenation. It follows from this that where the need for an aqueous base as a solvent or diluent for these hydrogenation reactions is indicated by reasons of economy or convenience, it would be a distinct advantage to find a catalyst which would promote hydrogenation under these conditions.

The process of the present invention achieves hydrogenation of hydroxy-substituted aromatic hydrocarbons and alkoxy-substituted aromatic hydrocarbons without detectable hydrogenolysis occurring, and in the absence or substantial absence of sulfur poisoning of the catalyst. In accordance with the process, the compound to be hydrogenated, which is of the group consisting of hydroxy-substituted aromatic hydrocarbons, alkoxy-substituted aromatic hydrocarbons, polyhydroxy-substituted aromatic hydrocarbons and polyalkoxy-substituted aromatic hydrocarbons, is treated in an alkaline diluent such as an alkaline solution with hydrogen in the presence of a ruthenium-containing catalyst. In addition to the improvements previously set forth, by reason of employment of the alkaline diluent together with the ruthenium catalyst, entirely unexpected and surprising results were achieved in that the hydrogenation rate was increased several hundred percent over that obtained using water or acid solution as diluent. However, when using the prior art Raney nickel catalyst, the alkaline diluent was found to actually hinder the hydrogenation.

The concentration of the alkali in solution can vary from about .0001 M to 4.0 M, preferably from about .001 M to 1.0 M. The alkaline solution is preferably an aqueous alkaline solution. Use of alkali concentrations in the solution much below .0001 M should be avoided to assure attaining the increased hydrogenation rate. While concentrations of alkali substantially above 4.0 M can be used, these higher concentrations ordinarily do not result in further improvement in the hydrogenation rate and may be disadvantageous from a commercial standpoint.

The alkaline solutions may be prepared by the addition of any soluble alkaline hydroxide or alkaline material which on hydrolysis gives an alkaline solution. Exemplary of such alkali or alkaline materials are hydroxides of alkali metals such as sodium, potassium or lithium or of ammonia, or carbonates of sodium or potassium. At times it is efficacious to use organic bases such as tetramethyl ammonium hydroxide, as these organic bases have the salutary effect of increasing the solubility of an organic substrate in an aqueous medium.

The ruthenium is preferably supported on a carrier, for example carbon, alumina, carbonates such as barium carbonate, sulfates such as barium or calcium sulfate, asbestos, silica, etc. Use of the carrier achieves maximum efficiency of the ruthenium and a greater resistance of the catalyst to poisoning. The concentration of the ruthenium in the supported catalyst can vary, by weight, from about .05 percent–10 percent, preferably from about 1 percent–5 percent (based on catalyst plus carrier).

The hydroxy-substituted aromatic hydrocarbons, alkoxy-substituted aromatic hydrocarbons, polyhydroxy-substituted aromatic hydrocarbons and polyalkoxy-substituted aromatic hydrocarbons hydrogenated in accordance with the present invention include those which are substituted or unsubstituted in the nucleus. Examples of such hydroxy-substituted aromatic hydrocarbons and polyhydroxy-substituted aromatic hydrocarbons are phenol, naphthols, cresols, hydroxybenzoic acids, resorcinol, dihydroxynaphthalenes and dimethylphenols. Examples of such alkoxy-substituted aromatic hydrocarbons and polyalkoxy-substituted aromatic hydrocarbons are anisole, methoxytoluenes, methoxynaphthalenes, ethoxybenzoic acids, diethoxybenzenes, dimethoxytoluenes and methoxyanthracenes.

The hydrogenation is carried out at temperatures from about 20°–400° C. and under pressures ranging from atmospheric to about 5000 p.s.i.g. Preferred temperatures and pressures are from about 25° C.–150° C. and from about 50 p.s.i.g.–200 p.s.i.g. respectively.

The process can be a continuous or batch operation. Either co-current or counter-current operation can be employed in a continuous operation.

The substrate or compound to be hydrogenated is preferably at least partially in solution in the alkaline solution. If the substrate is a liquid relatively insoluble in water, a water miscible organic liquid solvent such as a lower aliphatic alcohol, for instance methyl alcohol, ethyl alcohol or propyl alcohol can be used in typical amounts of from about 5–90 percent by weight (based on the alkaline solution) to increase solubility. If the substrate is a solid relatively insoluble in water, it is sometimes desirable to use, with the water, a water-immiscible organic liquid solvent, for instance cyclohexane or diethylether. The water-immiscible organic solvent is used in amount sufficient to dissolve or partially dissolve the solid.

The invention will further illustrate by reference to the following specific examples.

EXAMPLE I

The rates of hydrogenation of phenol, anisole, resorcinol, and p-dimethoxybenzene in neutral, acid, and alkaline solutions with ruthenium and platinum catalysts were measured. A Parr Pressure Reaction Apparatus was employed. The hydrogenation flask, in a typical case, was charged with 300 mg. of the catalyst and 50 ml. of the solvent. After evacuating the flask, it was pressured to 50 p.s.i.g. with hydrogen and shaken for 1 hour. The flask was then opened and 0.1 mol of the substrate added. The flask was again flushed and recharged. This evacuation procedure was repeated at least 5 times to free the solution of dissolved oxygen. The flask was then recharged to 50 p.s.i.g. The shaker was started and the rate of hydrogenation was determined by the decrease in pressure as a function of time. When the pressure fell to 40 p.s.i.g., the flask was repressured to 50 p.s.i.g. The total pressure drop in 4 hours was the unit used in comparing catalyst activity. On this equipment, 8 p.s.i. pressure change represents 0.1 mol of hydrogen.

In Table I below are listed the results obtained using various catalysts in neutral, acid, and alkaline solutions, and following the procedure described above. The effect of pH on the various catalysts used in the hydrogenation of phenol, anisole, and p-dimethoxybenzene is indicated. In all cases 50 ml. of solvent, 0.1 mol of substrate and 300 mg. of catalyst were used. The initial pressure was 50 p.s.i.g. and all catalysts were prehydrogenated 1 hour at 50 p.s.i.g. before adding the substrate. The rate of hydrogenation is expressed in ml. of hydrogen absorbed per minute per 300 mg. of catalyst.

*Table I.—Effect of pH on hydrogenation rate*

| Ex. | Catalyst | Mg. catalyst | Substrate | 0.1 N HCl | H₂O | 0.1 N NaOH |
|---|---|---|---|---|---|---|
| 1 | 5% Pt/C | 300 | Phenol | 21.5 | 4.6 | 3.0 |
| 2 | 5% Ru/C | 300 | do | 0.0 | 2.0 | 7.5 |
| 3 | 5% Pt/C | 300 | Anisole | 3.8 | 1.0 | 0.0 |
| 4 | 5% Ru/C | 300 | do | 0.0 | 0.9 | 10.0 |
| 5 | 5% Pt/C | 300 | p-Dimethoxybenzene | 2.6 | 5.0 | 0.0 |
| 6 | 5% Ru/C | 300 | do | 0.0 | 1.3 | 7.0 |

Rate expressed in ml. $H_2$ absorbed/minute per 300 mg. of catalyst. Initial pressure, 50 p.s.i.g.; 25° C., 50 ml. solvent, 0.1 mol substrate. Repressured to 50 p.s.i.g. when pressure fell to 40 p.s.i.g. All catalysts prehydrogenated 1 hour at 50 p.s.i.g. before adding substrate.

The above samples and data of Table I are clearly illustrative of the anomalous behavior of a ruthenium catalyst in alkaline solution. Where a platinum catalyst was used in alkaline solution, the hydrogenation rate shows a marked decrease. However, the rate of hydrogenation with the ruthenium catalyst is increased several hundred percent in alkaline solution.

In Table II, below, are listed the change of rates of hydrogenation of phenol, resorcinol, anisole and p-dimethoxybenzene when a 5 percent Ru on carbon catalyst is used in 0.1 N HCl, neutral H₂O, and 0.1 NaOH. The procedure and quantities described above in Table I was followed and used.

*Table II.—Hydrogenation of phenols and alkoxybenzenes with ruthenium*

|  | Phenol | Resorcinol | Anisole | p-Dimethoxybenzene |
|---|---|---|---|---|
| 0.1 N HCl | 0.0 |  | 0.0 | 0.0 |
| Water | 2.0 | 0.0 | 0.9 | 1.3 |
| 0.1 N NaOH | 7.5 | 1.2 | 10.0 | 7.0 |

Rate in ml. $H_2$ absorbed/minute. 300 mg. 5 percent Ru/C, 0.1 mol substrate, 50 ml. solvent, 50 p.s.i.g. initial pressure, room temperature.

The marked increase in reaction rate in alkaline solution is clearly indicated by the above data of Table II.

It will be obvious to those skilled in the art that many modifications may be made within the scope of the present invention without departing from the spirit thereof, and the invention includes all such modifications.

What is claimed is:

1. A process for the hydrogenation of a compound of the group consisting of hydroxy-substituted aromatic hydrocarbons, alkoxy-substituted aromatic hydrocarbons, polyhydroxy-substituted aromatic hydrocarbons and polyalkoxy-substituted aromatic hydrocarbons, which comprises admixing the compound and an aqueous alkaline solution diluent having an alkali concentration of at least about .0001 M, and treating the resulting admixture with hydrogen at a reaction temperature and pressure in the presence of a ruthenium-containing catalyst whereby the hydrogenation is effected without detectable hydrogenolysis occurring.

2. A process for the hydrogenation of a compound of the group consisting of hydroxy-substituted aromatic hydrocarbons, alkoxy-substituted aromatic hydrocarbons, polyhydroxy-substituted aromatic hydrocarbons and polyalkoxy-substituted aromatic hydrocarbons, which comprises admixing the compound and an aqueous alkaline solution diluent having an alkali concentration from about .0001 M–4.0 M, and treating the resulting admixture with hydrogen at a temperature from about 20° C.–400° C. and a pressure within the range of from atmospheric pressure to about 5,000 p.s.i.g. in the presence of a ruthenium-containing catalyst whereby the hydrogenation is effected without detectable hydrogenolysis occurring.

3. The process of claim 2 wherein the concentration of the alkali in the solution is from about .001 M to 1.0 M.

4. The process of claim 2 wherein the ruthenium is supported on a carrier.

5. The process of claim 4 wherein the carrier is carbon.

6. The process of claim 4 wherein the concentration of ruthenium on the carrier is from about 1–5 weight percent.

References Cited by the Examiner

UNITED STATES PATENTS

| 2,478,261 | 8/49 | Frank | 260—631 |
| 2,555,912 | 6/51 | Arnold | 260—617 |
| 2,828,335 | 3/58 | Ferstandig et al. | 260—514 |

LEON ZITVER, *Primary Examiner.*

CHARLES B. PARKER, JOSEPH R. LIBERMAN, *Examiners.*